MAGNETIC CORE SHIFT REGISTERS

Filed Nov. 20, 1963 2 Sheets-Sheet 1

INVENTOR.
SEENING YEE
BY S.C.Yeaton
ATTORNEY

MAGNETIC CORE SHIFT REGISTERS

Filed Nov. 20, 1963 2 Sheets-Sheet 2

INVENTOR.
SEENING YEE
BY
B. C. Yeaton
ATTORNEY

United States Patent Office 3,363,241
Patented Jan. 9, 1968

3,363,241
MAGNETIC CORE SHIFT REGISTERS

Seening Yee, Whitestone, N.Y., assignor to Sperry Rand Corporation, Great Neck, N.Y., a corporation of Delaware Filed Nov. 20, 1963, Ser. No. 324,960
2 Claims. (Cl. 340—174)

The invention herein described was made in the course of or under a contract or subcontract thereunder, with the Department of the Navy.

This invention relates to shift registers and more particularly to magnetic core shift registers having a steady D.C. output.

Magnetic core shift registers are well known in the art. They are popular because they are relatively insensitive to disturbances from noise and comparatively inexpensive.

These shift registers are somewhat limited, however, because they produce an output in the form of a pulse. In many applications, steady D.C. output voltages are required to operate logic circuits and the like. In these instances, additional flip flops must be used to produce the required steady D.C. output.

Shift registers have been designed in which the various magnetic cores are intercoupled by active coupling elements such as blocking oscillators to supply switching pulses of sufficient amplitude to drive auxiliary circuits. These devices produce output signals from the blocking oscillators in the form of elongated pulses when the magnetic cores are switched. Information read out of a core in these devices triggers the appropriate blocking oscillator. The pulse of the blocking oscillator sets the following core at the same time that the oscillator is triggered. The duration of the pulse from the blocking oscillator can be made longer than the trigger pulse necessary to switch the second core. There is a possibility, however, that the shift register can produce a false indication in this circuit. Information is shifted from one magnetic core to the next in response to an "advance" pulse. The blocking oscillator is switched much faster than the cores. If two successive cores happen to be set to the binary one state, and then the first core happens to shift a little faster than the second in response to an advance pulse, the pulse from the blocking oscillator can drive the second core toward the binary one state before the "advance" pulse has switched that core to the zero state. Thus, the second core would not have been completely switched and would not produce the expected output voltage.

It is an object of the present invention to provide a magnetic core shift register of high reliability.

It is another object of the present invention to provide a magnetic core shift register with steady direct current output voltages.

It is still another object of the present invention to provide a magnetic core shift register that produces both direct and complementary signals indicative of the state of the various cores.

These and other objects are achieved in the present invention by storing information to be shifted in an auxiliary storage means for a predetermined length of time before reading this information into the following magnetic core and by retaining the information in the auxiliary storage means after the following magnetic core has been switched in accordance with this information.

The principles of the invention can be understood by referring to the following description together with the drawings wherein.

Figure 1:
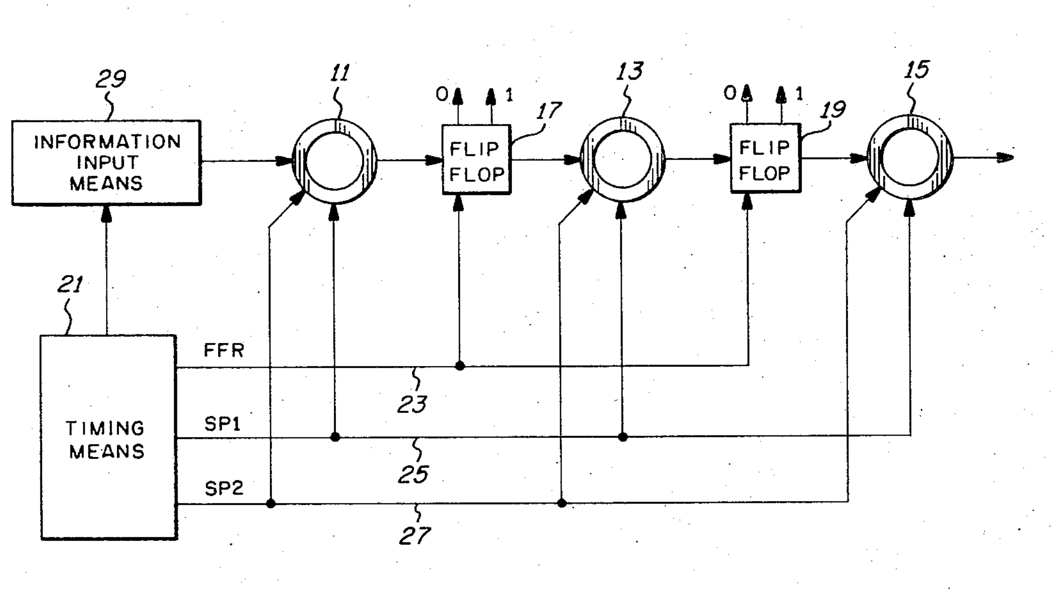
FIG. 1 is a block diagram of a circuit employing the invention.
Figure 2:
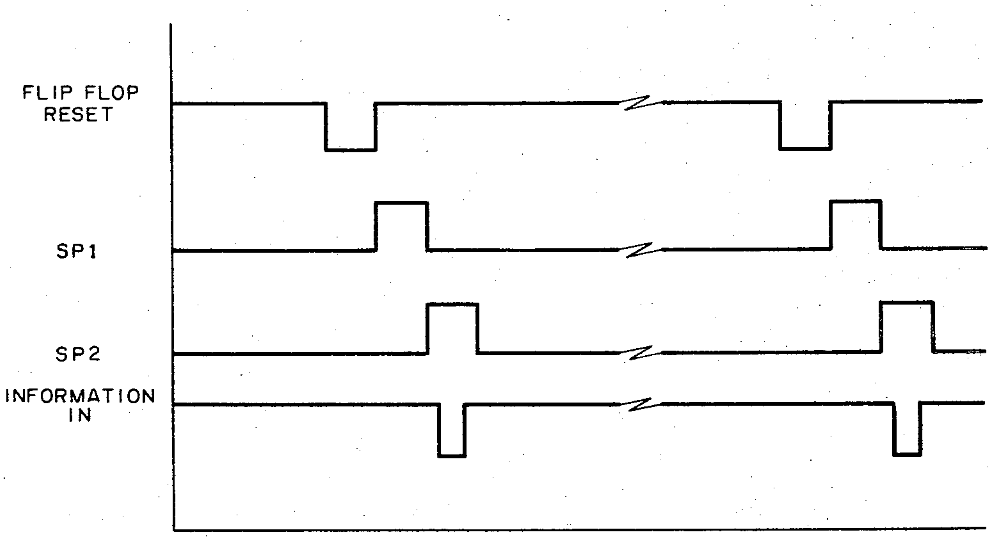
FIG. 2 is a timing diagram representing the sequence of events occurring in the circuit of FIG. 1.

Referring now to FIGS. 1 and 2, a three-stage shift register contains magnetic cores 11, 13 and 15. Intercoupling these cores are two auxiliary storage means 17 and 19. These auxiliary storage means preferably are in the form of conventional flip flop circuits. Outputs from these flip flops may be taken from two reciprocal points in each circuit so as to provide voltages representing the zero and one states respectively. A timing means 21 first provides a flip flop reset pulse (FFR) on the line 23 which serves to set the flip flops to the zero state. At the termination of the flip flop reset pulse on line 23, the timing means produces a first switching pulse on the line 25. This "advance" pulse (SP1) serves to advance the information from the cores 11 and 13 to the flip flops 17 and 19 respectively. At the termination of this pulse, the timing means produces a second switching pulse (SP2) on the line 27 which serves to switch the cores 13 and 15 in accordance with the information stored in the flip flops 17 and 19 respectively. At the same time that this second switching pulse is generated, the timing means 21 triggers the information input means 29 so as to read a new bit of information into the magnetic core 11. Thus it can be seen that information is read into the flip flops, delayed for a predetermined length of time which is sufficient to allow all of the magnetic cores to complete their respective switching cycles, and only then is new information read into the various cores. Although the SP2 pulse switches the magnetic cores in accordance with the information stored in the flip flops, this pulse does not switch the flip flops. The steady D.C. voltages remain on the flip-flop output terminals until the following reset pulse (FFR) appears on the line 23.

Figure 3:
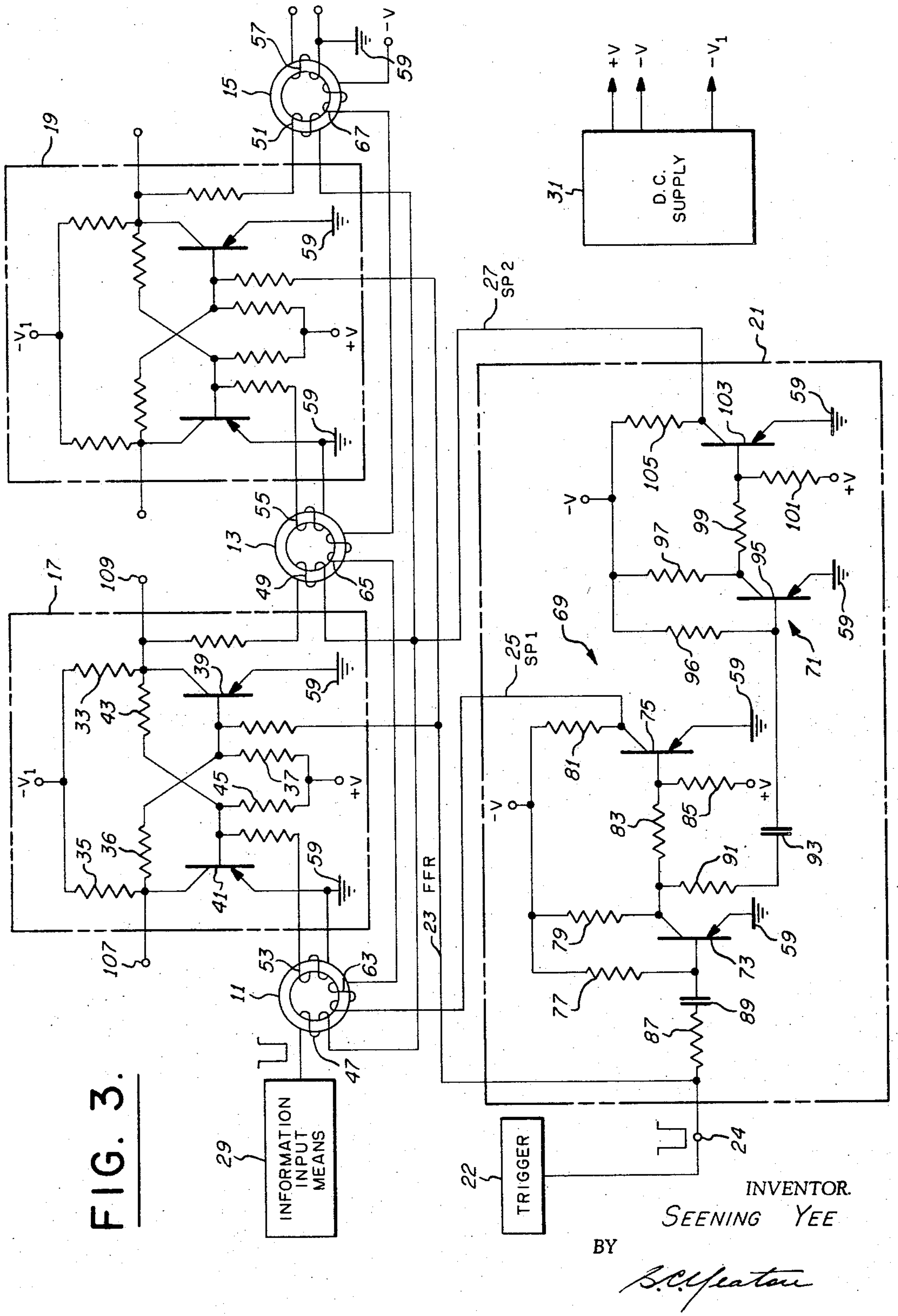
FIG. 3 is a circuit diagram of the device that is represented in block form in FIG. 1.

The operation of the invention can be more completely understood by referring to FIG. 3. This figure is a detailed circuit diagram of the circuit outlined in block form in FIG. 1.

A source of voltage 31 provides voltages +V, —V, and $-V_1$ suitable to operate the various transistors. The voltages +V and —V are typically in the order of plus and minus 12 volts respectively whereas $-V_1$ is typically about minus 22 volts. The magnetic cores 11, 13, and 15 are intercoupled by means of the flip flops 17 and 19. Since these flip flops are identical, the description of the flip flop 17 applies to 19 also.

First and second collector resistors 33 and 35 interconnect the $-V_1$ source of voltage and the collectors of the PNP transistors 39 and 41 respectively. Feedback resistors 36 and 37 are proportioned to provide a voltage that cuts off the transistor 39 when the transistor 41 is conducting. Similarly, the feedback resistors 43 and 45 are proportioned to provide a cutoff voltage to the base of the transistor 41 when the transistor 39 is conducting.

The flip flop circuit 17 is considered to be in the binary zero state when the transistor 39 is conducting and in the binary one state when the transistor 41 is conducting.

The magnetic cores 11, 13, and 15 are supplied with input windings 47, 49, and 51 respectively. The cores are further supplied with output windings 53, 55, and 57 respectively as well as advance windings 63, 65, and 67, respectively.

The input winding 47 is oriented so that a negative-going input pulse from the information input means 29 can switch the core 11 to a first or binary one state. Similarly, the input windings 49 and 51 are oriented so as to provide a magnetizing force that can switch the associated cores to the binary one state when the preceding flip flop is in the binary one state.

The output windings each have one terminal connected to a common ground 59. These windings are oriented so as to provide a negative going output pulse on the ungrounded terminal whenever the associated magnetic core is switched from the binary one to the binary zero state. The output winding 53 is coupled to the base terminal of the transistor 41 so that when the core 11 is switched from the binary one to the binary zero state, the resultant negative going pulse can turn the transistor 41 on and leave the flip-flop 17 in the binary one state. Similarly, the winding 55 is connected so that it can switch the flip flop 19 to the binary one state when the core 13 is switched from the binary one to the binary zero state.

The advance windings 63, 65, and 67 are connected in series to the —V source of potential. These windings are oriented so as to provide a magnetizing force that can switch the cores to the binary zero state when a current from the timing means 21 passes through these windings.

The timing means 21 comprises a pair of timing circuits 69 and 71. The first timing circuit 69 includes a pair of PNP timing transistors 73 and 75. The base and collector of the first transistor 73 are connected to the $-V_1$ voltage source through the resistors 77 and 79 respectively. The collector of the second transistor 75 is connected to this same source through the resistor 81. A voltage divider comprising the resistors 83 and 85 connects the collector of the transistor 73 to the +V voltage source. The resistors 79, 83, and 85 are proportioned to maintain the transistor 73 in a saturated condition and the transistor 75 in cut-off condition during quiescent periods. The collector terminal of the transistor 75 is connected to the advance coils on each of the magnetic cores 11, 13 and 15 by means of the line 25.

An input trigger signal from an external trigger source 22 is coupled to the transistor 73 through an input terminal 24, a resistor 87, and a coupling capacitor 89. The capacitor 89 and the resistor 77 effectively constitute a differentiating circuit.

The trigger signal also appears on the line 23 which conveys this trigger signal to the base terminals of the output transistors in each flip flop circuit.

The second timing circuit 71 contains the same circuit elements as the previously discussed timing circuit 69. The second timing circuit receives an impulse from the collector terminal of the transistor 73. This impulse passes through the resistor 91 and a coupling capacitor 93 to the base of an input timing transistor 95. This transistor is normally biased to saturation by means of the resistors 96 and 97. The resistors 97, 99, and 101 are proportioned to bias the PNP output timing transistor 103 to cut off during quiescent periods. A limiting resistor 105 in the collector circuit of the transistor 103 is made sufficiently large to prevent current in the line 27 from switching the magnetic state of the cores when the transistor 103 is cut off.

The operation of the circuit can be understood by referring to the circuit diagram of FIG. 3 together with the timing diagram of FIG. 2.

The shift cycle is initiated by applying a negative-going trigger pulse to the resistor 87. This pulse passes through the line 23 and constitutes a "flip flop reset" (FFR) pulse which switches each flip flop to the zero state. In this state, the transistor 39 of the flip flop 17 and the corresponding transistor in the flip flop 19 are both saturated. The collectors of these transistors are essentially at ground potential and the collectors of the alternate transistors in the flip flop circuits are at a relatively high negative value. This trigger pulse also appears at the base of the transistor 73 after passing through the resistor 87 and the capacitor 89. The leading edge of this pulse drives the base of the transistor 73 more negative. However, this cannot affect the transistor since it is already saturated. When the trigger pulse returns to zero, however, a positive-going pulse is applied to the base of the transistor 73 which cuts off this transistor. As this transistor is cut off, its collector voltage is driven negative. This negative-going voltage is applied to the base electrode of the transistor 75. The transistor 75, which is normally cut off, is driven to saturation by this negative-going pulse. The transistor 75 is maintained in this saturated state for a predetermined length of time, since the transistor 73 will remain cut off for a period of time determined by the time constant of the capacitor 89 and the associated circuit resistances. When the transistor 75 saturates, its collector is effectively grounded. This causes a pulse of current (SP1) to flow through the advance windings 63, 65, and 67 on the magnetic cores. These windings are so oriented that the pulse of current drives the cores to the binary zero state. Any of the cores which contained a binary one will thus experience a reversal of flux and produce an output voltage in the respective output windings. This voltage will switch the following flip flop to the binary one state.

Thus a flip flop reset pulse will have set each of the flip flops to the zero state. At the termination of this pulse an SP1 or advance pulse from the transistor 75 will reverse the flux in the cores containing a binary one. Since the trigger pulse has a definite duration, however, the advance pulse must occur at a predetermined time after the onset of the flip flop reset pulse.

The SP1 pulse serves to read information out of the cores 11 and 13 and into the flip flops 17 and 19, respectively. This pulse also serves to read information out of the final core 15.

When the transistor 73 is cut off at the termination of the input pulse, its collector voltage increases in the negative direction. This change in voltage is conveyed to the base electrode of the transistor 95 by virtue of the differentiating action of the capacitor 93 and the associated resistors. However, this negative-going voltage cannot affect the transistor 95 because this transistor is normally saturated. However, when the transistor 73 returns to its conducting state, its collector voltage approaches ground potentials. This positive-going voltage passes through the coupling capacitor 93 and appears on the base electrode of the transistor 95 as a positive-going pulse. This pulse cuts off the transistor 95, causing its collector voltage to approach the $-V_1$ source of negative voltage. This change in voltage, in turn, is applied to the base of the transistor 103 and causes this transistor to saturate. When the transistor 103 saturates, the line 27 is effectively switched from a negative potential to ground potential. This constitutes the SP2 pulse. Any current flowing in line 27 need now pass only through the low transistor resistance to ground. The SP2 pulse occurs, it will be remembered, only after the transistor 73 is returned to its normally conducting state, and after the SP1 pulse on the line 25 has terminated.

By the time that the SP2 pulse commences, all of the cores will have been switched to the binary zero state by the first switching pulse SP1.

The SP2 pulse effectively grounds the line 27. If a binary one is being stored in the information input means 29 at this time, a negative pulse can flow from this input means, through the input winding 47, through the line 27, and to ground. This current will switch the core 11 to the binary one state.

If the information input means has a passive output circuit such as a magnetic core which requires a strobe pulse for readout, this strobe pulse can be derived from the SP2 pulse.

The SP2 pulse also permits the information stored in the flip flops to switch the following magnetic cores.

Assume, by the way of explanation, that the core 11 had originally stored a binary one. The flip flop reset pulse would have set the flip flops to the zero state and the SP1 pulse would have switched the cores to the binary zero state. When the SP1 pulse switched the core 11 to the zero state, the flux change in this core would have generated a voltage in the winding 53 that would switch the flip flop 17 to the binary one state. In this state, the transistor 39 would be cut off and the potential at the collector of this transistor would increase to a negative value determined largely by the relative resistances of the resistors 33 and 43. In practice, these resistors are selected to provide a collector voltage substantially equal to the voltage of the source —V when the transistor 39 is cut off.

With the flip flop 17 in this binary one condition, there is substantially no voltage across the input winding 49 until the occurrence of an SP2 pulse. Any voltage difference that does occur will produce a negligible current flow through the winding because of the current limiting effect of the resistor 105.

When SP2 occurs, however, the line 27 is effectively grounded through the transistor 103. With the collector electrode of the transistor 39 at a negative voltage, current flows through the coil 49 and the core 13 is switched to the binary one state. The impedance level of the switching circuit is made sufficiently high relative to the impedance level of the flip flop circuits so that this switching current through the input winding 49 has a negligible effect on the flip flop.

Even though the core 13 has been switched to the binary one state, the flip flop 17 remains in the binary one state. The output terminals 107 and 109 may conveniently be used to supply steady D.C. output voltages indicative of the state of the core 13. These steady voltages, representing both the digit stored and the complement of that digit, will be available until the following flip flop reset pulse initiates the next shift cycle.

If the core 11 had originally been in the binary zero state, the flip flop 17 would remain in the binary zero state throughout the shift cycle. The collector of the transistor 39 would remain at substantially ground potential. The resistor 105 would limit the current through the line 27 during quiescent periods so that this current would have negligible effect on the core 13. When SP2 occurred, the line 27 would be effectively grounded, so that during this time no current could flow in the line 27 and the core 13 would remain in the zero state. Since the SP2 pulse does not affect the flip flops, the flip flop 17 would remain in the zero state throughout the cycle.

The switching pulse SP1, which switches the cores to the zero state, has a definite duration determined by the circuit constants in the timing means 21. Since the switching pulse SP2, which reads information into the cores, cannot commence until the termination of the SP1 pulse, the circuit of the present invention insures that a core will be completely switched to the binary zero state before new information can be read into that core. This insures a complete reversal of flux when information is to be read out of a core and the generation of an adequate output voltage as a result of this complete flux reversal.

It will be appreciated that the particular timing circuits which have been described may be replaced by other types of delay means if so desired. Various types of delay lines, for instance capable of producing a train of output pulses such as those illustrated, might be used for the timing means. Similarly, the flip flops might be replaced by other suitable bistable circuits if desired.

The previous description has been limited to a shift register employing only three magnetic memory cores and two intermediate flip flop circuits. It will be appreciated that many applications will require more stages than this. The number of stages has been purposely kept to a minimum in this description in the interest of clarity. The principles of the invention however can be applied to shift registers employing any number of stages.

Similarly, many applications would require a flip flop circuit actuated by the output coil of the final magnetic core 15. A flip flop identical to the flip flops depicted in FIG. 3 can be used for this purpose. Pulse output information can then be obtained from the output winding 57 as well as steady D.C. output voltages from the additional flip flop.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A magnetic core shift register:

(a) a series of magnetic memory cores;

(b) a pair of transistors arranged in a flip flop circuit and interposed between the first and the second of said memory cores;

(c) an output winding on the first of said memory cores, said output winding being connected to drive the first of said pair of transistors to saturation when the first memory core is switched to the binary zero state;

(d) an input winding on the second of said memory cores, said input winding having one terminal connected to the collector of the second of said pair of transistors, whereby this terminal of the input winding is raised to a relatively high voltage when said second transistor is in a cut off condition and is effectively grounded when this transistor is in a conducting condition;

(e) a source of trigger pulses, (f) means to switch said second transistor to the saturated state in response to a trigger pulse from said source;

(g) first and second timing transistors connected in grounded emitter circuits, each of said timing transistors being normally biased to cut off;

(h) means to drive said first timing transistor to saturation for a predetermined period of time commencing with the termination of a trigger pulse;

(i) means to switch the memory cores to the binary zero state when said first timing transistor is saturated;

(j) means to drive said second timing transistor to saturation at the time that said first timing transistor is being driven to cut off;

(k) a conductor interconnecting the second terminal of the memory core input winding and the collector of said second timing transistor;

(l) a source of potential; and (m) a limiting resistor interconnecting said source of potential and the collector of the second timing transistor, whereby current flowing through the memory core input winding must pass through this resistor when the second timing resistor is in a cut off condition, said limiting resistor being of sufficient magnitude to maintain current flowing through the magnetic core input winding below the level required for switching when the second timing transistor is cut off.

2. A magnetic core shift register comprising:

(a) a series of magnetic cores;

(b) a flip flop circuit;

(c) first and second flip flop transistors in said flip flop circuit, said flip flop transistors being of the PNP type connected in grounded emitter circuits;

(d) an output winding on the first of said magnetic cores, said winding being connected to the base electrode of said first flip flop transistor and being constructed and arranged to produce a negative-going voltage of sufficient magnitude to saturate said trantransistor when the magnetic core is switched from the binary one to the binary zero state;

(e) an input winding on the second of said magnetic cores, said winding being connected to the collector of said second flip flop transistor and being oriented to switch the magnetic core to the binary one state when current flows through the coil to this transistor;

(f) a timing means;
(g) an input terminal on said timing means;
(h) a source of negative-going trigger pulses connected to the input of said timing means;
(i) conducting means interconnecting said input terminal and the base of said second flip flop transistor whereby a flip flop reset pulse is applied to the flip flop in response to a trigger pulse;
(j) first and second pairs of grounded emitter PNP timing transistors in said timing means, the first transistor in each of said pairs being biased to saturation and the second of each of said pairs of transistors being biased to cut off during quiescent periods;
(k) individual resistor networks between the transistors in each pair of timing transistors, said networks interconnecting the collector electrode of the first transistor and the base electrode of the second transistor in the pair, said resistor networks being proportioned to provide a saturating voltage to the second transistor when the corresponding first transistor is cut off;
(l) a resistance-capacitance network interconnecting the input terminal of the timing means and the base electrode of the first transistor in the first pair of timing transistors, said network being proportioned to pass a positive pulse of sufficient magnitude to cut off this transistor at the termination of a trigger pulse;
(m) an advance winding in each magnetic core, said windings being connected in series relationship with each other and with the collector of the second transistor of the first pair of timing transistors, said advance windings being oriented on the various cores so as to switch these cores to the binary zero state when current flows through these windings from said second transistor;
(n) a resistance-capacitance network interconnecting the collector electrode of the first transistor in said first pair of timing transistors and the base electrode of the first transistor in said second pair of timing transistors, said network being proportioned to pass a positive pulse of sufficient magnitude to cut off the first transistor in the second pair when the first transistor in the first pair become saturated; and
(o) a conductor connecting the electrode of the second transistor of the second pair of timing transistors to said input winding, whereby a difference of potential is applied to the input winding when this timing transistor is saturated but the second flip flop transistor is cut off.

References Cited

UNITED STATES PATENTS

| | | | |
|---|---|---|---|
| 3,035,248 | 5/1962 | Grose et al. | |
| 3,059,226 | 10/1962 | Einsele | 340—174 |
| 3,069,662 | 12/1962 | Kaiser | 340—174 |
| 3,075,179 | 12/1963 | Woo et al. | 340—174 |
| 3,270,210 | 8/1966 | Mueller | 340—174 |

BERNARD KONICK, *Primary Examiner.*

L. SRAGOW, *Examiner.*

H. D. VOLK, M. S. GITTES, *Assistant Examiners.*